United States Patent [19]

Etter, Jr.

[11] 4,070,421
[45] Jan. 24, 1978

[54] CHLORINATED POLYMERIC COMPOSITIONS USEFUL AS PRIMERS FOR POLYOLEFINS

[75] Inventor: Raymond L. Etter, Jr., Longview, Tex.

[73] Assignee: Eastman Kodak Company, Rochester, N.Y.

[21] Appl. No.: 679,633

[22] Filed: Apr. 23, 1976

[51] Int. Cl.² ............................................. C08L 27/24
[52] U.S. Cl. .............................. 260/897 C; 260/27 R; 260/889
[58] Field of Search .................................... 260/897 C

[56] References Cited

U.S. PATENT DOCUMENTS

| | | | |
|---|---|---|---|
| 3,291,862 | 12/1966 | Armour et al. | 260/897 C |
| 3,351,677 | 11/1967 | Barton et al. | 260/889 |
| 3,551,526 | 12/1970 | Trieschmann et al. | 260/897 C |
| 3,575,779 | 4/1971 | Chapman et al. | 161/89 |

Primary Examiner—Carman J. Seccuro
Attorney, Agent, or Firm—Clyde L. Tootle; Daniel B. Reece, III

[57] ABSTRACT

This invention is concerned with new primers and with paint and ink additives which will improve adhesion of decorative and protective coatings to polyolefins, especially low and high density polyethylene. These new materials are prepared by the solution chlorination of a mixture of a hydrocarbon resin and a high molecular weight high density polyethylene or the blending of separately chlorinated hydrocarbon resins and high density polyethylene. The amount of hydrocarbon resin may vary from about 20 to 80 percent and the chlorine content of the chlorinated mixture or blend is from about 15 to about 35 percent by weight.

31 Claims, No Drawings

CHLORINATED POLYMERIC COMPOSITIONS USEFUL AS PRIMERS FOR POLYOLEFINS

This invention relates to novel chlorinated polymeric compositions and processes for their preparation. One aspect of this invention concerns chlorinated polymeric compositions prepared by the solution chlorination of a mixture of a hydrocarbon resin and a high density polyethylene. Another aspect of this invention concerns chlorinated polymeric compositions prepared by blending together a solution chlorinated hydrocarbon resin and a solution chlorinated high density polyethylene. Still another aspect of this invention concerns chlorinated polymeric compositions useful as primers and/or additives for adhesion improvement of decorative or protective coatings to polyolefins.

Polyolefins such as polyethylene and polypropylene are widely used in industry for various applications and it is desirable in many of these applications to be able to apply coatings such as paints, inks, and the like to the surface of the polyolefin for both decorative and protective purposes. However, due to the chemical inertness of the polyolefins, coatings do not adhere to them and various methods have been tried in the art to improve the adhesion of the coatings. For example, surface treatment by flame oxidation, corona discharge or chemical etching has been used but these methods do not yield satisfactory results for many articles, especially those of irregular shape. Also the bonds strengths of coatings on polyolefins treated by these methods are to low for many applications.

Another method which has been used in the art is priming of the polyolefin surface with a modified chlorinated polyolefin. For example, U.S. Pat. No. 3,579,485 discloses chlorinated carboxyl group containing poly-alpha-olefin compositions useful as primers for polyolefins. While these compositions provide satisfactory results, in many cases they have certain disadvantages that limit their use. For example, chlorinated maleated polypropylene is an excellent primer for promotion of adhesion of coatings to polypropylene substrates and low density polyethylene surfaces but does not provide satisfactory results on high density polyethylene surfaces.

In view of the disadvantages of prior methods of promoting adhesion of coatings to polyolefins, it would be desirable to provide a composition which is useful as a primer for various types of polyolefins, particularly high density polyethylene and ethylene-alpha-monoolefin copolymers and which provides better adhesion of coatings to the polyolefin substrate than previously used primer compositions.

In accordance with the present invention, I have found that compositions prepared from a mixture of solution chlorinated high density polyethylene and a hydrocarbon resin have a novel combination of properties. These compositions are soluble at room temperatures in xylene, toluene, and other paint solvents and when used as primers provide excellent adhesion of topcoat paints and inks to polyolefin substrates including both low and high density polyethylene, polypropylene, ethylene-alpha-monoolefinic copolymers and ethylene-propylene terpolymers. In addition to the excellent adhesion these compositions also provide a primer which enables the coating to maintain excellent abrasion resistance and hardness.

The compositions of this invention can be prepared by the solution chlorination of a mixture containing about 20 to 80 percent by weight high density polyethylene and about 80 to 20 percent by weight hydrocarbon resin. The compositions of this invention can also be prepared by separately solution chlorinating the high density polyethylene and hydrocarbon resin and mixing the two chlorinated components.

The high density polyethylenes useful in preparing the compositions of this invention have a density greater than 0.96 and a melt index at 190° C. of from about 0.5 to about 50, preferably about 30 to 50. These polyethylenes comprise about 20 to 80 weight percent, preferably about 40 to 70 weight percent, of the mixture that is subsequently chlorinated.

The hydrocarbon resins useful in preparing the compositions of this invention can be a resin such as DAC-B hydrocarbon resin prepared according to the process disclosed in the U.S. Pat. No. 3,701,760 as well as other hydrocarbon resins, synthetic polyterpenes, resin esters and the like derived from aliphatic and/or aromatic hydrocarbons. One such DAC-B hydrocarbon resin has a softening point of about 130° C. and is available commercially as "Resin H-130" from Eastman Chemical Products, Inc. Other hydrocarbon resins can be prepared by the polymerization of monomers consisting primarily of olefins and diolefins and include, for example, the residual by-product monomers resulting from the manufacture of isoprene. Commercially available hydrocarbon resins of this type are "Wingtack" resins sold by the Goodyear Tire and Rubber Company and the Sta-Tac and Betaprene resins sold by the Reichold Chemical Corporation. Other suitable resins are the low molecular weight polystyrene resins such as the "Piccolastic" resins sold by the Hercules Chemical Company.

The natural resins such as the polyterpenes, terpene polymers, and rosin esters, do not perform as well in this invention and give results inferior to the synthetic hydrocarbon resins.

The hydrocarbon resins useful in this invention have ring and ball softening points of from about 70° C. to about 140° C. and are used in amounts of about 20 to 80 weight percent, preferably about 30 to 60 weight percent, of the mixture that is subsequently chlorinated.

The chlorination process is carried out in solution, i.e., the mixture is dissolved in a solvent prior to the introduction of chlorine and remains in solution throughout the chlorination, and may be carried out either batchwise or continuously. The solvent used should be one which is inert to elemental chlorine and to hydrogen chloride. Suitable solvents include halogenated aromatics such as monochlorobenzene and halogenated aliphatics such as carbon tetrachloride. The chlorination can be carried out by introducing gaseous chlorine into the solution in the presence of ultraviolet light or a suitable free radical catalyst.

The concentration of the mixture in the chlorination solvent may be varied, but generally should not exceed 20 percent by weight, the preferred range being from about 5 to about 12 percent by weight. Concentrations greater than 20 percent provide solutions of high viscosity which are difficult to agitate adequately. The chlorination temperature may also be varied, but at about 160° C. the chlorinated polymer becomes susceptible to degradation. At a temperature of less than 50° C. the reaction is very slow. Generally, the preferred temperature range for the chlorination is from about 50° C. to about 120° C. The chlorination can be carried out under a moderate chlorine pressure if desired. However, it is generally preferable to carry out the reaction at essentially atmospheric pressure.

There are several ways to follow the progress of the chlorination reaction. The preferred method is to periodically isolate a sample of the chlorinated polymer and determine its chlorine content by the following procedure using a Thomas-OGG Oxygen Flash Igniter.

I. Burning Sample

1. Carefully weigh a 0.05 gram sample on an analytical balance.
2. Place the sample on the black sample wrapper, then place into the platium sample carrier.
3. Add 50 milliliters of 0.025 N NaOH to a one liter burning flask.
4. Add one milliliter of hydrogen peroxide (30 percent) to the flask.
5. Purge the flask with oxygen for two minutes.
6. Place the sample carrier on the sample hanger and insert into flask.
7. Place the flask in the chamber and line up the sample with the infrared lamp and ignite. (Caution: Be sure the door is locked and the hood is down.)
8. Allow the sample to burn to completion; then remove the flask from chamber.

II. Titration of Chloride

1. Gently shake the flask for two minutes.
2. Remove the sample hanger from the flask and pour its contents into a 250 milliliter beaker. Rinse the hanger and flask with distilled H$_2$O and add to beaker.
3. Add 3 milliliters of 6 N H$_2$SO$_4$ to the beaker to neutralize the NaOH.
4. Titrate this solution with 0.05 N AgNO$_3$.

III. Calculation $$\frac{(ml\ AgNO_3)\ (N\ AgNO_3)\ (mole\ weight\ Cl/10)}{(sample\ weight)} = \text{Weight Percent Chlorine}$$

When the desired chlorine content is reached, the polymeric product may be isolated by any of several methods well known in the art. The solvent may be removed by stripping with a hot gas or by vacuum distillation. If it is desired to recover the polymeric product as a primer solution, the reaction solvent can be displaced by another solvent such as xylene or toluene.

The chlorinated polymeric composition is chlorinated until the desired chlorine content is obtained. The chlorinated polymeric compositions for primer use should have a chlorine content of from about 15 to about 35 weight percent, preferably 20 to 27, and most preferably about 23 weight percent. Chlorinated compositions containing less than 15 weight percent chlorine have solubilities too low to be useful as primers. If the chlorine content is greater than 35 weight percent, the polymeric composition is very soluble and causes the primer coating to redissolve when coated with a topcoat.

For use as a primer, the chlorinated polymeric compositions are preferably applied as a solution. The preferred solvents for forming these solutions are aromatic solvents such as toluene and xylene. The primer solutions contain from about 1 to about 10 percent by weight, preferably about 2 to about 6 percent chlorinated polymeric composition. Solutions containing more than 10 percent are too viscous to spray, and solutions containing less than 1 percent do not contain sufficient chlorinated material to adequately prime the surface onto which it is applied.

It should also be noted that the chlorinated polymeric compositions can be incorporated into coating formulations such as paints and inks to provide materials that will simultaneously prime and coat a polyolefin surface.

Although the preferred method of preparing the chlorinated polymeric compositions of this invention is the solution chlorination of a mixture of high density polyethylene and hydrocarbon resin as described hereinbefore, an alternate method of preparation is by the separate solution chlorination of the high density polyethylene and the hydrocarbon resin with subsequent blending of the two chlorinated materials to obtain the desired composition. In this method the chlorination of the individual components is carried under the same conditions as the chlorination of the mixture.

This invention will be further illustrated by the following examples although it will be understood that these examples are included merely for purposes of illustration and are not intended to limit the scope of the invention.

EXAMPLE 1

The following general procedure was used for all solution chlorinations reported.

A four-necked, round-bottomed flash in fitted with the Teflon blade stirrer, chloride inlet tube extending to the bottom of the flask, Y-tube with glycol condenser, and a thermowell. The outlet of the condenser is connected through a large trap to a caustic scrubber (a 10 weight percent sodium hydroxide solution is used). The inlet tube is connected to a two-way valve which permits either chlorine or nitrogen gas to be used. A chlorine trap and a rotameter are placed in the chlorine inlet line.

The polymer or mixture to be chlorinated is dissolved in refluxing carbon tetrachloride or monochlorobenzene. After complete solution of the polymer, the catalyst, if used, is added and chlorine passed into solution for the required amount of time. Good stirring is maintained at all times. If the chlorine level in the flash begins to increase as noted by an increase in the green color, additional catalyst is added in 1 to 2 milliliter increments every 30 minutes. At the end of the chlorination period the excess chlorine is purged from the system with a good nitrogen flow. The solvent is then displaced with toluene or xylene to get a final product in solution.

Slurry chlorinations are made with the same apparatus and procedure are given above for solution chlorination except that polymer is not dissolved in the solvent. The polymer is isolated as a solid and dissolved in toluene or xylene to obtain the final form of use.

The coatings were tested as follows:

Two clean polyethylene panels are sprayed and flash dried (one coat) with the test primer. These primed panels are then topcoated with conventional paints diluted as per manufacturer's instructions (three coats — flash dried — then dried 30 minutes at 160° F.). The panels are tested for adhesion by crosshatching the paint surface with a sharp razor blade and then tested with pressure sensitive cellophane tape by pressing the tape firmly over the crosshatched area and then quickly removing the tape. The adhesion is rated by the following scale.

| Rating, % | Appearance of Crosshatched Section After Testing |
|---|---|
| 100 | No lifting of coating - 100% still on substrate; excellent adhesion. |
| 90 | Very slight lifting - 90% of coating still present; very good adhesion |
| 70-80 | Slight lifting - between 70-80% of coating still present; good adhesion. |
| 50-70 | Appreciable lifting over entire surface - 50-70% of coating present; fair adhesion. |
| 20-50 | Appreciable lifting - only 20-50% of coating left; poor adhesion. |
| 5-20 | Almost complete lifting - some adhesion present but only in small spots; fail adhesion. |
| 0 | Complete lifting of coating; fail adhesion. |

The apparent hardness of the coatings is tested using a stainless steel flat edge spatula ⅜ inch wide to scratch the test panel. The ease of removal of the paint was observed and rated as follows:

10 — No removal of topcoat from substrate
8 - 20 percent removal of topcoat from substrate
6 - 40 percent removal of topcoat from substrate
4 - 20 percent removal of topcoat from substrate
2 - 10 percent removal of topcoat from substrate
0 — Complete removal of the topcoat from the substrate — complete failure

The apparent hardness is actually another measure of adhesion; it is a much more rigorous test and gives are indication of the performance of a coating during actual use.

EXAMPLES

This invention is described by the chlorination examples tabulated in Table I. The results of tests of these chlorinated polymers as primers are given in Table II and Table III.

Example 1 is the preferred embodiment of the invention, while Examples 2 and 3 illustrate the criticality of the chlorine content. Examples 4, 5, 6 and 7 show the effect of different ratios of components. Example 8 is a slurry chlorination and shows that polymer chlorinated in this manner is not soluble at room temperature in common paint solvents such as toluene, xylene, etc. Examples 9 and 10 of Table I and Examples 9 and 10 of Table II illustrate the blending of separately chlorinated products of yield an improved hardness material. Examples 11 and 12 show the utility of other aliphatic and aromatic resins while Examples 13 and 14 show natural resins such as polyterpene and rosin do not yield a satisfactory primer. Table III illustrates the utility of the primers of this invention to flexible substrates. Table IV illustrates the utility of the compositions of this invention as a primer for polypropylene and also shows that while chlorinated maleated polypropylene is a good primer for polypropylene substrates, it does not provide satisfactory results on polyethylenes, particularly high density polyethylenes.

Table I

| | | | | | Product | | |
|---|---|---|---|---|---|---|---|
| Example No. | Material Chlorinated | Solvent | Chlorination Temp., °C. | Chlorination Time, Min. | % Cl | % Solids in Xylene | Remarks |
| 1 | 50% Resin H-130, 50% HDPE | CB | 115 | 30 | 22.4 | 23.7 | |
| 2 | 50% Resin H-130, 50% HDPE | CB | 115 | 20 | 15.3 | 25.7 | Very thick solution-gel |
| 3 | 50% Resin H-130, 50% HDPE | CB | 115 | 40 | 26.8 | 24.4 | |
| 4 | 30% Resin H-130, 70% HDPE | CB | 115 | 30 | 22.7 | 24.1 | |
| 5 | 40% Resin H-130, 60% HDPE | CB | 115 | 30 | 23.9 | 25.6 | |
| 6 | 60% Resin H-130, 40% HDPE | CB | 115 | 35 | 22.8 | 24.6 | |
| 7 | 100% HDPE | CB | 115 | 60 | 24.2 | 20.0 | |
| 8 | 50% Resin H, 50% HDPE (both powdered) | H$_2$O | 25 | 60 | 23.2 | 20.1 | Solid gel |
| 9 | 100% HDPE | CB | 115 | 20 | 17.8 | 18.4 | |
| 10 | 100% Resin H-130 | CB | 115 | 30 | 25.1 | 38.0 | |
| 11 | 50% Super Sta-Tac, 50% HDPE | CB | 115 | 30 | 23.1 | | |
| 12 | 50% Piccolastic A-75 | CB | 115 | 30 | 22.0 | | |
| 13 | 50% Nirez 1135 | CB | 115 | 30 | 19.1 | — | Gelled during chlorination |
| 14 | 50% Floral 108 | CB | 115 | 30 | 20.6 | — | Gelled during chlorination |

CB = chlorobenzene
HDPE = High Density Polyethylene (Density 0.975, MI = 32).
Resin H-130 = Eastman Hydrocarbon Resin (Softening Point = 130° C.)
Super Sta-Tac = Synthetic Hydrocarbon (Reichold Chemical Corporation)
Piccolastic = Polystyrene Type Resin (Hercules Chemical Company)
Nirez 1135 = Polyterpene Type Resin (Reichold Chemical Corporation)
Foral 108 = Rosin Ester Type Resin (Hercules Chemical Company)

Table II

Primer Tests

| | | | | Topcoat-Adhesion | | | |
|---|---|---|---|---|---|---|---|
| Polymer of Example No. | Composition of Primer Coated From 5% Solids in Xylene | % Cl | Substrate | Sherwin Williams Acrylic Lacquer | Duracryl Acrylic Lacquer | Alpha-Cryl Acrylic Lacquer | Apparent Hardness |
| 1 | 50% Resin H-130, 50% HDPE | 22.4 | LDPE | 100 | 100 | 100 | 10 |
| 2* | 50% Resin H-130, 50% HDPE | 15.3 | LDPE | 99 | 100 | 95 | 8 |
| | | | HDPE** | 100 | 100 | 90 | 8 |
| 3 | 50% Resin H-130, 50% HDPE | 26.8 | LDPE | 100 | 100 | 90 | 8 |
| | | | HDPE** | 100 | 100 | 85 | 6 |
| 4 | 30% Resin H-130, 70% HDPE | 22.7 | LDPE | 100 | 100 | 95 | 10 |
| | | | HDPE** | 100 | 90 | 8 | |
| 5 | 40% Resin H-130, 60% HDPE | 23.9 | LDPE | 100 | 100 | 95 | 8 |
| | | | HDPE** | 100 | 100 | 85 | 8 |
| 6 | 60% Resin H-130, 40% HDPE | 22.8 | LDPE | 100 | 100 | 90 | 10 |
| | | | HDPE** | 100 | 95 | 80 | 6 |
| 7 | 100% HDPE | 24.2 | LDPE | 100 | 100 | 100 | 2 |
| | | | HDPE** | 100 | 100 | 85 | 2 |
| 8 | 50% Resin H-130, 50% HDPE | 23.2 | LDPE | Not soluble at room temperature | | | |

Table II-continued

Primer Tests

| Polymer of Example No. | Composition of Primer Coated From 5% Solids in Xylene | % Cl | Substrate | Topcoat-Adhesion Sherwin Williams Acrylic Lacquer | Duracryl Acrylic Lacquer | Alpha-Cryl Acrylic Lacquer | Apparent Hardness |
|---|---|---|---|---|---|---|---|
| | (slurry chlorinated) | | HDPE** | Could not prime | | | |
| 9-10 | 50% Example No. 9, Table I, 50% Example No. 10, Table I (on a % Solids Basis) | | LDPE | 100 | 100 | 100 | 8 |
| | | | HDPE** | 100 | 100 | 100 | 7 |
| 11 | 50% Super Sta-Tac, 50% HDPE | | LDPE | 80 | 100 | 100 | 8 |
| | | | HDPE* | 100 | 100 | 100 | |
| 12 | 50% Piccolastic A-75 | | LDPE | 100 | 100 | 100 | 7 |
| | | | HDPE** | 100 | 100 | 100 | |

*Primed from 2 percent solution due to thickness of solution.
LDPE = low density polyethylene (Density 0.918, MI = 1.7)
HDPE = high density polyethylene (Density 0.975. MI = 32)
**HDPE = high density polyethylene (Density .968, MI = 2)

Table III

Primer Tests of Flexible Substrates

| Polymer of Example No. | Composition | % Cl | Substrate | Topcoat-Adhesion DuPont Dexlar Flexible Enamel | PPG Durethane Flexible Enamel | Apparent Hardness |
|---|---|---|---|---|---|---|
| 1 | 50% Resin H-130; 50% HDPE | 22.4 | EPDM Rubber Nordel 2903 | 100 | 100 | 8-9 |
| 1 | 50% Resin H-130; 50% HDPE | 22.4 | Thermoplastic Elastomer (Uniroyal 1900) | 100 | 100 | 10 |
| 1 | 50% Resin H-130; 50% HDPE | 22.4 | Thermoplastic Elastomer (Profax 814B) | 100 | 100 | 8-9 |

Table IV

Primer Tests

| Primer | Composition | % Cl | Substrate | Topcoat-Adhesion Sherwin Williams Acrylic Lacquer | Duracryl Acrylic Lacquer | Alpha-Cryl Acrylic Lacquer | Apparent Hardness |
|---|---|---|---|---|---|---|---|
| Polymer of Example 1 | Chlorinated 50% Resin H-130, 50% HDPE | 22.4 | Polypropylene | 100 | 100 | 100 | 7 |
| Eastman | Chlorinated Maleated Polypropylene (Prepared According to U.S. Pat. 3,579,485) | 19.3 | Polypropylene | 100 | 100 | 100 | 9-10 |
| | | | Low Density PE | 30 | 60 | 40 | 5 |
| | | | High Density PE | 0 | 0 | 0 | — |

Although the invention has been described in considerable detail with particular reference to certain preferred embodiments thereof, variations and modifications can be effected within the spirit and scope of the invention.

I claim:

1. A chlorinated polymeric composition useful as a primer for polyolefin surfaces containing from about 15 to about 35 weight percent chlorine comprising a blend of from about 20 to 80 weight percent of at least one chlorinated polyethylene prepared from polyethylene having a density greater than 0.96 and a melt index at 190° C. of from about 0.5 to about 50 and about 80 to 20 weight percent of at least one chlorinated synthetic hydrocarbon resin selected from the group consisting of DAC-B hydrocarbon resin, synthetic polyterpenes, and low molecular weight polystyrene resins.

2. A chlorinated polymeric composition according to claim 1 wherein said polyethylene has a density greater than 0.96 and melt index at 190° C. of from about 30 to about 50.

3. A chlorinated polymeric composition according to claim 2 wherein said chlorinated synthetic hydrocarbon resin is prepared from synthetic hydrocarbon resin selected from the group consisting of DAC-B hydrocarbon resin, synthetic polyterpenes, and low molecular weight polystyrene resins and having a softening point of from about 70° C. to about 140° C.

4. A chlorinated polymeric composition according to claim 3 wherein said synthetic hydrocarbon resin is DAC-B hydrocarbon resin.

5. A chlorinated polymeric composition useful as a primer for polyolefin surfaces containing from about 15 to about 35 weight percent chlorine comprising a blend of from about 40 to 70 weight percent of at least one chlorinated polyethylene prepared from polyethylene having a density greater than 0.96 and a melt index at 190° C. of from about 0.5 to about 50 and about 60 to 30 weight percent of at least one chlorinated synthetic hydrocarbon resin selected from the group consisting of DAC-B hydrocarbon resin, synthetic polyterpenes, and low molecular weight polystyrene resins.

6. A chlorinated polymeric composition according to claim 5 wherein said polyethylene has a density greater than 0.96 and a melt index at 190° C. of from about 30 to about 50.

7. A chlorinated polymeric composition according to claim 6 wherein said chlorinated synthetic hydrocarbon resin is prepared from synthetic hydrocarbon resin selected from the group consisting of DAC-B hydrocarbon resin, synthetic polyterpenes, and low molecular weight polystyrene resins and having a softening point of from about 70° C. to about 140° C.

8. A chlorinated polymeric composition according to claim 7 wherein said synthetic hydrocarbon resin is DAC-B hydrocarbon resin.

9. A chlorinated polymeric composition useful as a primer for polyolefin surfaces containing from about 20 to about 27 weight percent chlorine comprising a blend of from about 20 to 80 weight percent of at least one chlorinated polyethylene prepared from polyethylene having a density greater than 0.96 and a melt index at 190° C. of from about 0.5 to about 50 and about 80 to 20 weight percent of at least one chlorinated synthetic hydrocarbon resin selected from the group consisting of DAC-B hydrocarbon resin, synthetic polyterpenes, and low molecular weight polystyrene resins.

10. A chlorinated polymeric composition according to claim 9 wherein said polyethylene has a density greater than 0.96 and a melt index at 190° C. of from about 30 to about 50.

11. A chlorinated polymeric composition according to claim 10 wherein said chlorinated synthetic hydrocarbon resin is prepared from synthetic hydrocarbon resin selected from the group consisting of DAC-B hydrocarbon resin, synthetic polyterpenes, and low molecular weight polystyrene resins and having a softening point of from about 70° C. to about 140° C.

12. A chlorinated polymeric composition according to claim 11 wherein said synthetic hydrocarbon resin is DAC-B hydrocarbon resin.

13. A chlorinated polymeric composition useful as a primer for polyolefin surfaces containing from about 20 to about 27 weight percent chlorine comprising a blend of from about 40 to 70 weight percent of at least one chlorinated polyethylene prepared from polyethylene having a density greater than 0.96 and a melt index at 190° C. of from about 0.5 to about 50 and about 60 to 30 weight percent of at least one chlorinated synthetic hydrocarbon resin selected from the group consisting of DAC-B hydrocarbon resin, synthetic polyterpenes, and low molecular weight polystyrene resins.

14. A chlorinated polymeric composition according to claim 13 wherein said polyethylene has a density greater than 0.96 and a melt index at 190° C. of from about 30 to about 50.

15. A chlorinated polymeric composition according to claim 14 wherein said chlorinated synthetic hydrocarbon resin is prepared from synthetic hydrocarbon resin selected from the group consisting of DAC-B hydrocarbon resin, synthetic polyterepenes, and low molecular weight polystyrene resins and having a softening point of from about 70° C. to about 140° C.

16. A chlorinated polymeric composition according to claim 15 wherein said synthetic hydrocarbon resin is DAC-B hydrocarbon resin.

17. A chlorinated polymeric composition useful as a primer for polyolefin surfaces containing about 23 weight percent chlorine comprising a blend of from about 20 to 80 weight percent of at least one chlorinated polyethylene prepared from polyethylene having a density greater than 0.96 and a melt index at 190° C. of from about 0.5 to about 50 and about 80 to 20 weight percent of at least one chlorinated synthetic hydrocarbon resin selected from the group consisting of DAC-B hydrocarbon resin, synthetic polyterpenes, and low molecular weight polystyrene resins.

18. A chlorinated polymeric composition according to claim 17 wherein said polyethylene has a density greater than 0.96 and a melt index at 190° C. of from about 30 to about 50.

19. A chlorinated polymeric composition according to claim 18 wherein said chlorinated synthetic hydrocarbon resin is prepared from synthetic hydrocarbon resin selected from the group consisting of DAC-B hydrocarbon resin, synthetic polyterpenes, and low molecular weight polystyrene resins and having a softening point of from about 70° C. to about 140° C.

20. A chlorinated polymeric composition according to claim 19 wherein said synthetic hydrocarbon resin is DAC-B hydrocarbon resin.

21. A chlorinated polymeric composition useful as a primer for polyolefin surfaces containing from about 23 weight percent chlorine comprising a blend of from about 40 to 70 weight percent of at least one chlorinated polyethylene prepared from polyethylene having a density greater than 0.96 and a melt index at 190° C. of from about 0.5 to about 50 and about 60 to 30 weight percent of at least one chlorinated synthetic hydrocarbon resin selected from the group consisting of DAC-B hydrocarbon resin, synthetic polyterpenes, and low molecular weight polystyrene resins.

22. A chlorinated polymeric composition according to claim 21 wherein said polyethylene has a density greater than 0.96 and a melt index at 190° C. of from about 30 to about 50.

23. A chlorinated polymeric composition according to claim 22 wherein said chlorinated synthetic hydrocarbon resin is prepared from synthetic hydrocarbon resin selected from the group consisting of DAC-B hydrodcarbon resin, synthetic polyterpenes, and low molecular weight polystyrene resins and having a softening point of from about 70° C. to about 140° C.

24. A chlorinated polymeric composition according to claim 23 wherein said synthetic hydrocarbon resin is DAC-B hydrocarbon resin.

25. A method for preparing a chlorinated polymeric composition useful as a primer for polyolefin surfaces comprising preparing a blend containing from about 20 to 80 weight percent of a polyethylene having a density greater than 0.96 and a melt index at 190° C. of from about 0.5 to about 50 and about 80 to 20 weight percent of a synthetic hydrocarbon resin selected from the group consisting of DAC-B hydrocarbon resin, synthetic polyterpenes, and low molecular weight polystyrene resins and having a softening point of from about 70° C. to about 140° C. and solution chlorinating the blend to a chlorine content of from about 15 to about 35 weight percent chlorine.

26. A method for preparing a chlorinated polymeric composition according to Claim 25 wherein the blend is chlorinated in the chlorination solvent at a concentration of blend to solvent less than 20 percent by weight.

27. A method for preparing a chlorinated polymeric composition according to claim 26 wherein the chlorination is carried out at a temperature of 50 to 120° C.

28. A method for preparing a chlorinated polymeric composition according to claim 27 wherein said chlorination solvent is a member of the group consisting of halogenated aromatic and halogenated aliphatic compounds.

29. A method according to claim 28 wherein said halogenated aromatic compound is monochlorobenzene.

30. A method according to claim 28 wherein said halogenated aliphatic compound is carbon tetrachloride.

31. A method for preparing a chlorinated polymeric composition useful as a primer for polyolefin surfaces which comprise preparing a blend containing about 20 to 80 weight percent chlorinated polyethylene prepared from polyethylene having a density greater than 0.96 and a melt index at 190° C. of from about 0.5 to about 50 and about 80 to 20 weight percent of a chlorinated synthetic hydrocarbon resin prepared from synthetic hydrocarbon resin selected from the group consisting of DAC-B hydrocarbon resin, synthetic polyterpenes, and low molecular weight polystyrene resins and having a softening point of from about 70° C. to about 140° C. to provide a blend having a chlorine content of from about 15 to about 35 weight percent chlorine.

* * * * *